June 12, 1973  E. R. McFARLAN  3,738,899
AIR CONDITIONING SYSTEM AND METHOD
Filed Aug. 2, 1971  2 Sheets-Sheet 1

INVENTOR.
Edward Russell McFarlan
BY
Curtis, Morris & Safford
ATTORNEYS

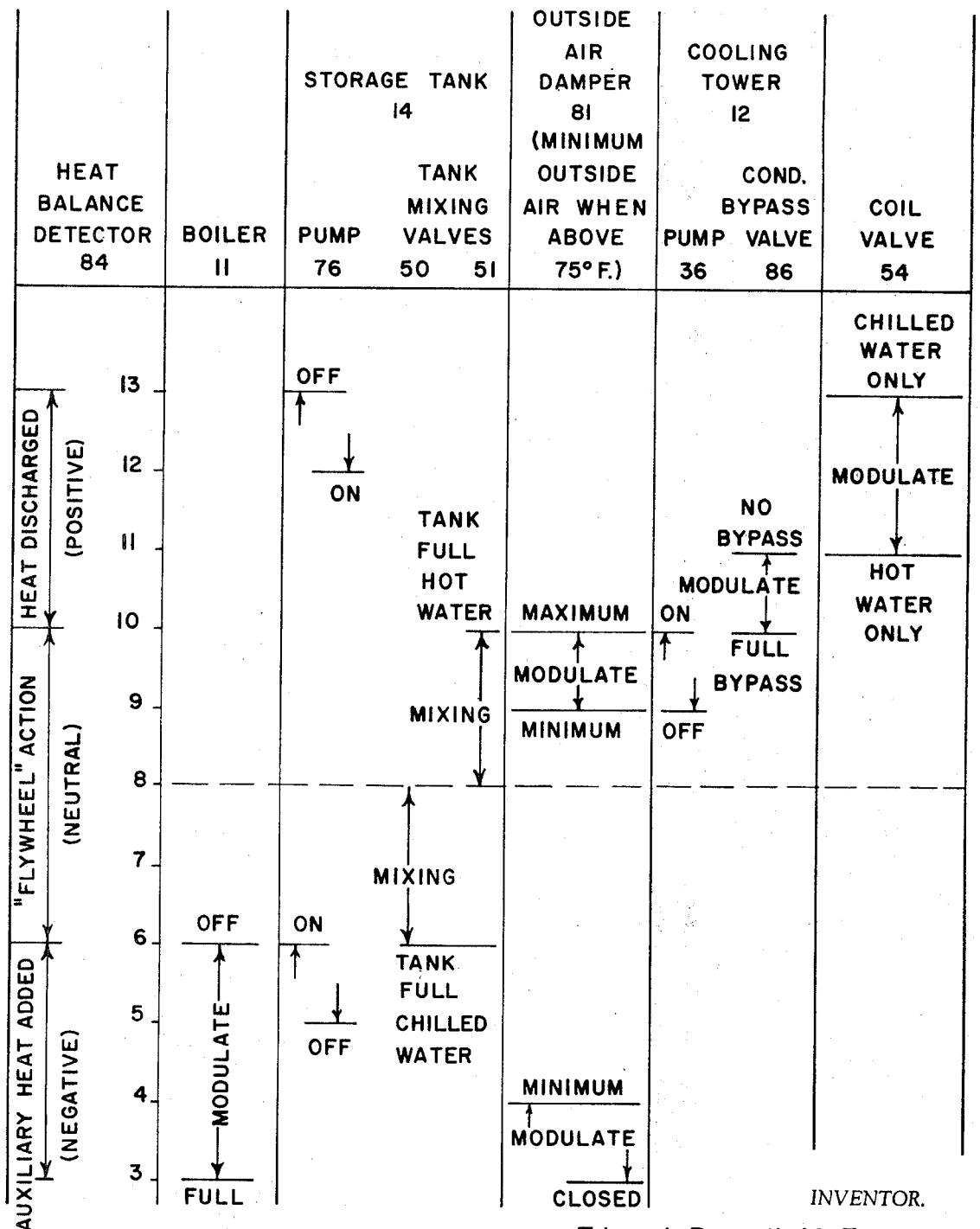

3,738,899
AIR CONDITIONING SYSTEM AND METHOD
Edward Russell McFarlan, Westfield, N.J., assignor to
A. I. McFarlan Company, Inc., Springfield, N.J.
Filed Aug. 2, 1971, Ser. No. 168,013
Int. Cl. F25b 13/60
U.S. Cl. 165—2         15 Claims

ABSTRACT OF THE DISCLOSURE

An air conditioning system and method of the type wherein streams of hot water and chilled water are supplied from a central station to air treating units and the water returns to the central station from each of the units through a common return line. A storage tank is connected to receive both chilled water and heated water depending upon the operating conditions, and provides a "flywheel effect," i.e., heat is removed from the tank during periods of dominant heating load conditions by passing chilled water to the tank where it is stored in anticipation of a need for increased cooling, and heat is delivered to the tank during periods of dominant cooling load conditions by passing heated water to the tank where it is stored in anticipation of a need for increased heating.

---

This invention relates to air conditioning systems and methods, and particularly to such systems and methods which incorporate the "heat balance principle." In accordance with that principle, heat is transferred from one zone of the system where there is excess heat to another zone where there is a deficiency of heat, whenever such an excess or deficiency exist; and, heat is discarded from the system only when there is an overall excess of heat for the entire system, or added to the system only when there is an overall deficiency of heat for the entire system. For any particular set of operating conditions, there is a "break even temperature" (BET), which is the outside air temperature at which the heat losses from the system are exactly equal to the heat produced within the system and which is available to make up for the heat losses.

An object of this invention is to provide an improved air conditioning system and method for operating and controlling the same. A further object is to provide an air conditioning system which is adapted to handle peak cooling and peak heating loads in an efficient and dependable manner. A further object is to provide for the above with equipment which is of a minimum size and which operates at high efficiency throughout wide ranges of operating conditions. These and other objects will be in part obvious and in part pointed out below.

In air conditioning systems of the type disclosed in A. I. McFarlan Pat. No. 3,354,943, streams of water are heated and cooled by a refrigeration system at a central station and chilled and heated water streams are supplied to various air treating units so that the air is either heated or cooled to maintain desired conditions in each of the various zones. Each of the air treating units discharges the water to a common return line system through which the water passes back to the central station. Such systems provide year-round comfort conditions with reduced operating expenses while avoiding difficulties as compared with various prior conventional systems. Heat is carried from a zone or zones requiring cooling to a zone or zones requiring heating, so that the excess heat in the one zone or the zones balances the requirements for heat in the other zone or zones.

It has been found that in many large buildings the heat produced within the building core is sufficient to balance the loss of heat from the exterior of the building even at relatively low outside temperatures. With systems of this type, the break even temperature may vary from hour to hour, and may vary over a wide range during a twenty-four hour period, so that the system may require heating at night and cooling during daytime.

With the heat balance system shown in the patent referred to above, the heat balance is of an "instantaneous" or simultaneous nature in that the system always operates immediately, as the case may be, to discharge any excess heat or to produce auxiliary heat when there is a deficiency. Hence, during a twenty-four hour period when operating conditions require cooling during the daytime and then auxiliary heating during the nightime, the system discharges the excess heat during the daytime and provides the necessary auxiliary heating during the nightime.

With systems of the present invention, the same heat balance conditions are maintained at all times, the ultimate effect being to discharge heat or add auxiliary heat as it is required. However, the present invention also has a "carry-over" or "flywheel effect," whereby the heat balance has a time factor and is not merely based upon instantaneous or simultaneous operating conditions. During a period of operation when the temperature conditions make it desirable to provide heat within the zones, the first effect is to utilize heat which has been stored up in a body of water from a previous period when there was an excessive amount of heat. The system also stores up "cooling capacity" when heating is required by chilling the body of water so as to provide auxiliary cooling means during the next period when cooling is required. Hence, heat which would normally be discharged from the system is stored and used at a later time, and the extracting of additional heat provides the "free cooling" at a later time.

In the drawings in which one of the embodiments of the invention is represented schematically:

FIG. 2 is a tabulated control sequence chart indicating how the system operates.

Figure 1:
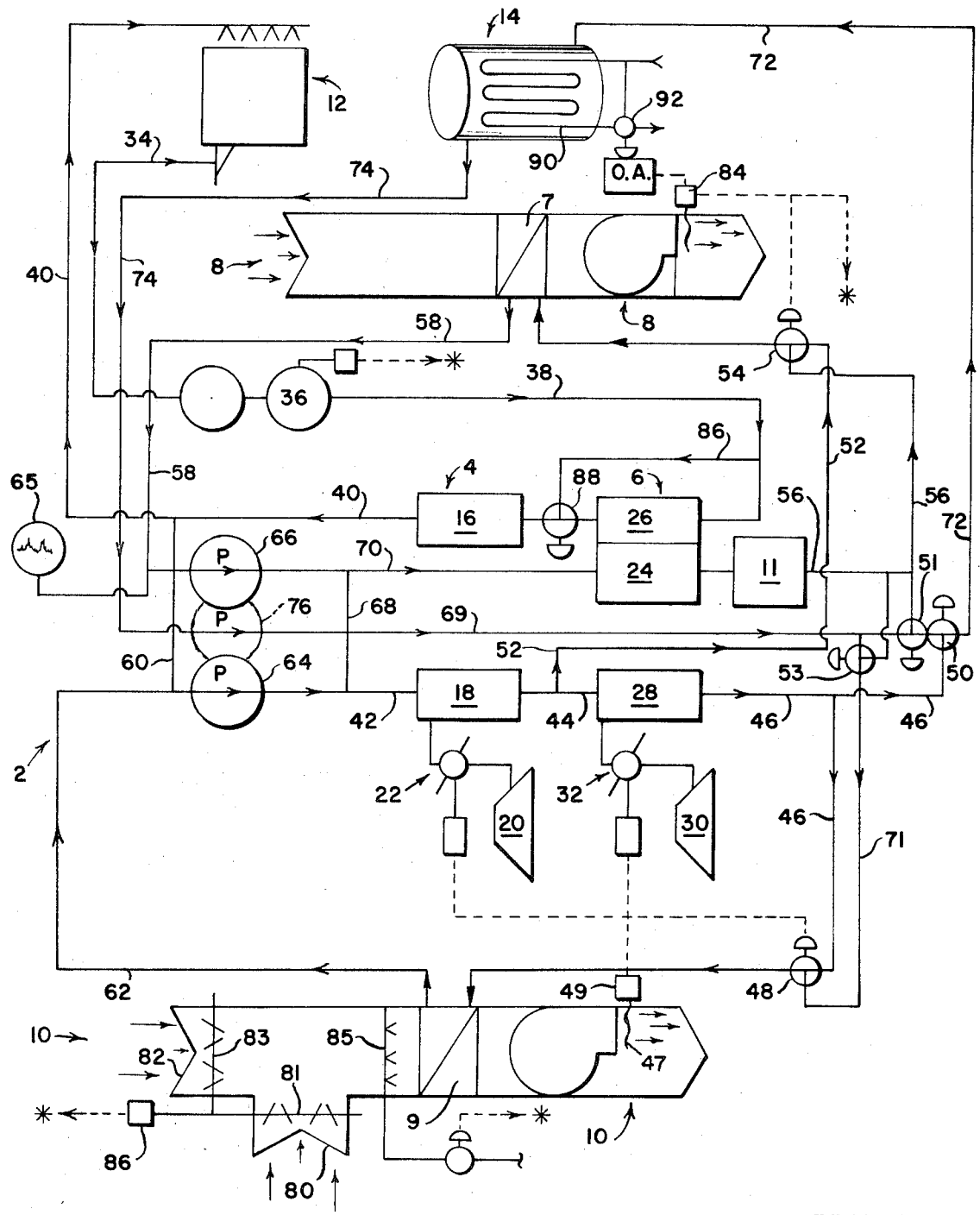
FIG. 1 is a diagram of the system.

Referring to FIG. 1 of the drawings, a refrigeration system 2 is represented with two refrigeration units 4 and 6, two air-treating units 8 and 10 with air coils 7 and 9, respectively, a boiler 11, an evaporative cooling tower 12, a water storage tank 14, and a water circulating system which will be described below. Refrigeration unit 4 has a condenser 16, an evaporator-chiller 18, a compressor 20, a temperature control unit 22 and other standard components. Refrigeration unit 6 has a "double condenser" formed by two condensers 24 and 26, an evaporator-chiller 28, a compressor 30, a temperature control unit 32 and other standard components.

The water circuit for the cooling tower extends from the return line 34 to a pump 36 and thence through a line 38, condenser section 26, condenser 16 and a line 40 back to the tower where the water is cooled by evaporative cooling. The chilled water circuit extends from a supply header line 68 through a line 42, evaporator chiller 18, a line 44, evaporator-chiller 28, and a line 46 which extends to a control valve 48 for air-treating unit 10 and to a line 72 through a valve 50 which controls the flow of water to tank 14. There is also a chilled water line 52 for chilled water from evaporator-chiller 18 which extends from line 44 to a control valve 54 for air-treating unit 8. The heated water circuit extends through condenser section 24 and boiler 11 and a hot water line 56, which extends to valve 54 for unit 8 and through a valve 51 to valve 50 for tank 14.

The water flows from units 8 and 10, respectively, through return lines 58 and 62 to a common return header line 60. Two pumps, 64 and 66, which are selected to produce identical head pressures but with different flow rates, are connected in parallel to draw water from common return header line 60 and deliver water to a common supply header line 68. A line 74 connects the opposite side of the tank to a storage water pump 76 which also discharges into the supply header line 68. The return-water from units 8 and 10 and tank 14 flows from supply header line 68 to the following: the chilled water circuit through a line 42; the heated water circuit through a line 70; and a return-water line 69.

The return-water can flow from line 69 through manually operable valve 53 and a line 71 to valve 48 so that unit 10 can receive return-water which has been neither heated nor chilled. Unit 10 supplies air to the interior of the building which is always a cooling load during normal operation. Hence, unit 10 normally requires chilled water from line 46, and the air discharge temperature is controlled by mixing return-water from line 71 and line 69 with the chilled water at valve 48 under the control of a controller 49 having a temperature sensor 47 in the air discharge stream. For most systems that provides very satisfactory control for unit 10, and the invention contemplates that valve 53 will be omitted from most systems of this type. However, unit 10 receives fresh air, and for some systems it is desirable to provide valve 53 which can be turned to supply heated water from line 56 to line 71. However, with the normal position of valve 53, line 71 is connected to receive water solely to line 69. Line 69 is also connected to valve 51, which permits heated water and the return-water, or a mixture of the two, to be supplied to valve 50. Therefore, valve 50 may supply water through line 72 to tank 14 by any of the following: chilled water only from line 46; heated water only from line 56 and valve 51; return-water from line 69 only through valve 51; water from valve 51 which is a mixture of heated water and return-water from line 69; or mixtures of the chilled water with the water from valve 51. It is thus seen that the common return header line 60 and header line 68 act as balancing headers for the pumps 64 and 66 in parallel, and the return-water flows from header 68 to the various circuits at the desired temperatures in response to the demands for heating and cooling functions. With valves 50, 51 and 53 positioned as shown, return-water from line 69 is supplied through line 71 to valve 48 and through line 72 to tank 14, and no heated water or chilled water is supplied to those lines. As indicated above, valve 53 may be manually turned to supply a mixture of heated water or solely heated water to line 71, for example, to handle "warm up" heating loads. With valves 50 and 51 positioned as shown, pump 76 merely recirculates water to and from the tank, and as will be explained below, that flow is maintained at the "break even temperature." Under substantial cooling load conditions, valve 50 remains as shown, and valve 51 is turned to pass a mixture of heated water and return-water, or solely heated water, through valve 50 and thence to tank 14. Under substantial heating load conditions, valve 51 remains in the position shown, and valve 50 is turned to pass a mixture of chilled water and return-water or solely chilled water to tank 14.

Air-treating unit 8 is supplied with chilled water from evaporator-chiller 18 through lines 44 and 52, and that water is at a higher temperature than the chilled water which is supplied to unit 10 from evaporator-chiller 28 through line 46 and mixing valve 48. Unit 8 receives only return air, and supplies air to the periphery or "envelope" of the building. Unit 10 receives controlled percentages of outside air and return air through outside air inlet 80 having louvers 81 and a return air inlet 82 having louvers 83. Louvers 81 and 83 are controlled by a control unit 84.

Condenser 26 has a bypass line 86 extending from line 38 to a control valve 88 whereby a variable amount of water in the cooling tower circuit may be bypassed around condenser 26. During maximum cooling load conditions the entire stream of cooling tower water flows through condenser 26 and thence through condenser 16 so that water flows to the cooling tower is at the maximum temperature and heat is discharged from the system at a high rate. However, the bypassing of a portion or all of the stream of cooling tower water around condenser 26 raises the temperature of the hot water flowing from the double condenser 24 to line 56, and it produces a reduction in the temperature of the water flowing to the cooling tower, and a corresponding reduction in the amount of heat which is discharged from the system. That reduction in the amount of heat which is being discharged from the system is evidenced by an elevated temperature level in condenser 26 and an increase in heat which is available but the resultant increase in the temperature of the hot water provides added advantages.

The operation of the system is under the complete control of the "heat balance detector" 84 which is also responsive to the temperature of the discharged air from unit 8, and may be made also responsive to the outside air temperature. The control functions are effected by a sequencing control system which is shown as a pneumatic system and which produces simultaneous and coordinated control for the components of the system. In the discussion below, the range of operation is explained in terms of "Control Points" corresponding to pneumatic pressures in the system.

The overall control of the system will be explained below in connection with FIG. 2 of the drawing, and it is assumed that Point 8 is the pressure at the Break Even Temperature (BET). The BET is the outside temperature at which the heat loss from the system exactly equals the heat produced within the system, without the addition of auxiliary heat. This BET changes with variations of enthalpy in the outside air ventilation and the solar heating effects and with changes in the production of internal heat by lighting, machines and occupants. At temperatures below BET, heat is being lost from the system at a rate greater than it is being produced within the system without the aid of auxiliary heating. At temperatures above BET, heat is being produced within the system at a rate which is greater than the rate at which it is being discharged, disregarding the cooling tower or another heat sink. At BET, the storage water pump 76 may be stopped, and then it blocks the flow of water from tank 14 so that the system operates without regard to the temperature of the body of water in tank 14. However, in the preferred mode of operation of the illustrative embodiment, pump 76 operates continuously throughout the central range above and below the BET between Points 6 and 12.

Assuming that the system is operating at BET, mixing valves 50 and 51 supply only return-water from line 69 to tank 14. If there is a drop in the control point below Point 8, valve 50 starts to mix chilled water with the return-water, with an increasing amount of chilled water and a correspondingly decreasing amount of return water to the tank, and chilled water only flows to the tank at Point 6. During that mode of operation, the refrigeration system operates as a heat pump by removing heat from the stream of water flowing from tank 14 and through the evaporator-chillers, and that heat is passed through the condenser to the stream of hot water. That reduces the average temperature of the water in the tank, the reduction resulting from passing the chilled water to the tank and withdrawing water at a higher temperature from the tank. When the control point drops below Point 6 boiler 11 starts to operate at its minimum load rate, and pump 76 is stopped at Point 5. Boiler 11 then heats the water in the hot water line, and the amount of heat produced by boiler 11 increases throughout the range from Point 6 to Point 3, at which time the boiler is operating at full load. In the meantime, however, pump 76 remains stopped and the body of water in tank 14 remains unchanged at the minimum chilled water temperature, for example, 45° F.

The "normal" setting for the outside air damper 80 is so as to bring in the "minimum" quantity of outside air between Points 9 and 4. However, during extreme heating load conditions from Point 4 to Point 3, damper 80 is gradually closed further beyond the normal minimum setting, and is fully closed at Point 3. The minimum setting is maintained between Points 4 and 9, and between Points 9 and 11 the damper is modulated to its maximum open position where it remains above Point 11. However, the minimum setting is maintained whenever the heat level in the outside air exceeds the heat level in the air being exhausted, e.g., 75° F. Hence, the quantity of fresh air which is provided to the system never falls below "minimum" throughout the normal heating and cooling ranges.

As the heating load decreases, the boiler is turned off at Point 6, and the storage tank water pump 76 is started. Upon a further rise from Point 6 to Point 8, mixing valve 50 moves gradually from a position where it supplies chilled water only to the tank to a position where it supplies only return-water from line 69. Upon a further rise from Point 8 to Point 10, valve 50 remains in the position shown, but valve 51 is turned gradually to mix an increasing amount of hot water from line 56 with the stream of return-water from line 69. That mixture flows through valve 50 and line 72 to the tank, and heated water only flows to the tank between Points 10 and 13. Pump 76 is turned off at Point 13 and it is restarted upon a drop back to Point 12. When pump 76 has been stopped and is restarted while the tank is filled with chilled water, the chilled water from the tank which flows through the evaporator-chillers and increases the cooling capacity of the overall system while operating at a load on the refrigeration system less than the system load.

Cooling tower 12 is placed into operation by the starting of pump 36 upon a rise to Point 10, and pump 36 is turned off upon a drop to Point 9. Bypass valve 88, which controls the flow of cooling tower water around condenser 26, is open at point settings below Point 10, so that all of the cooling tower water flows through the bypass line. Upon a rise above Point 10, valve 88 starts to open to decrease gradually the stream of water which is bypassed around the condenser, and at Point 11 the entire stream flows through the condenser. As indicated above, the bypassing of water around condenser 26, reduces the rate at which heat is discharged from the system through the cooling tower, and increases the temperature of the water leaving the condenser 24. Hence, below Point 10 the temperature of the water delivered to the tank is at its maximum. Within the range of operation above Point 9, heat is being discharged from the system by increasing the amount of outside air at temperatures below 75° F. and by the operation of the cooling tower. Nevertheless, during that time the temperature of the hot water in line 56 is normally at substantially its maximum temperature so that tank 14 is filled with hot water when pump 36 is stopped above Point 13.

Modulating the bypassing of water around condenser 26 permits a substantial variation in the amount of heat which is discharged from the system through the cooling tower. Also, the higher temperature of hot water flowing through mixing valve 54 to the air coil of unit 8 permits the unit to handle a greater heating load while hot water only is supplied to the coil. Between Points 11 and 13, valve 54 gradually reduces the proportion of hot water and increases the proportion of chilled water, so that chilled water only flows to the coil at Point 13.

It is thus seen that the system has three general ranges of operation, below Point 6 when auxiliary heat is being added, between Points 6 and 10 during which the tank provides the "Flywheel effect" and heat is being neither added nor discharged from the system, and above Point 10 when heat is being discharged from the system. At the Break Even Temperature, pump 76 continues to operate but water is merely circulated from and to the tank. Assuming that the system has been operating below Point 8 and that the tank contains cold or chilled water, a rise above Point 8 indicates a need for disposing of excess heat and that is readily handled, using the chilled water in the tank as a heat sink. Assume now that the system operates above Point 8 for a period of time and then drops below Point 8. The tank then contains heated water or warm water from which heat is extracted to assist in handling the heating load. There can be wide swings in the operating conditions between Points 6 and 10, with a quantity of heat being stored in the tank above Point 8, and with the heat thus stored being utilized below Point 8 and there being no need for auxillary heating. It should be emphasized however, that the system is so designed and engineered so as to balance the heating and cooling loads simultaneously in a manner set forth in U.S. Pat. No. 3,354,943, as discussed above.

Another important feature of the illustrative embodiment of the invention is the utilization of return-water from line 69 to provide the "heated water" in line 48 for unit 10. Pumps 64, 66 and 76 produce substantially equal discharge pressures so that the water discharged from the pumps tends to flow to the respective lines 42, 69 and 70. Nevertheless, the header lines 60 and 68 permits other flow patterns, header line 60 permitting crossflow between lines 58 and 62 to pumps 64 and 69.

Within the range of operation between Points 10 and 13, tank 14 is filled with water at a temperature which is substantially the temperature of the water flowing from the condenser. In this embodiment, a hot water coil 90 is positioned within the body of water in tank 14 and provides a source of heat for pre-heating domestic hot water. Coil 90 is used only when the water in the tank is at a relatively high temperature and when no substantial heating load is anticipated. A manually controlled bypass valve 92 may be turned to divert the flow through a bypass line to stop the flow through the coil.

In the illustrative embodiment, air treating unit 8 supplies air for the periphery of the building and unit 10 supplies air for one or more interior zones of the building. The invention contemplates that the system can have additional air-treating units with units of the type of unit 8 supplying various portions of the periphery of the building, and with additional units of the type of unit 10 supplying separate zones of the interior of the building.

When more than one unit 8 is used, the overall control of the system can be in accordance with the temperature of the hot water in line 56.

The system includes standard components including a water tank 65 connected to line 58 and control mechanisms which are not represented in FIG. 1. In FIG. 1 some of the circuits are indicated by broken lines, although most of the control circuits are omitted. Also, as various embodiments may be made of the above invention and as changes might be made in the embodiment above set forth, it is to be understood that all matters hereinbefore set forth or shown in the accompanying drawings is to be interpreted as illustrative and not in a limiting sense.

I claim:

1. In a method for maintaining comfort conditions within a plurality of zones one of which may require the removal of heat while another requires the addition of heat, the steps of delivering a stream of heat-absorbing-and-discharging liquid for each of said zones to provide controlled delivery of heat to and removal of heat from the zone, circulating air in heat exchange relationship with respect to each of said streams and thence within the respective zone, providing a liquid storage path along which liquid is stored and from which a stream of return liquid flows when liquid is supplied to that path, flowing said streams as return liquid to a central station, utilizing refrigeration to provide a liquid cooling path and a liquid heating path at said central station, passing portions of said return liquid in three streams one of which flows along said cooling path to provide a stream of chilled liquid and another of which flows along said heating path to provide a stream of heated liquid and the other being a return liquid stream, providing controlled flow of said streams as makeup liquid for said streams of heat-absorbing-and-discharging liquid in accordance with the heating and cooling requirements of the respective zones, passing the remainder of said streams of liquid which is not used as makeup liquid along said liquid storage path and from said storage path to the other of said streams of return liquid, accumulating liquid along said storage path to provide a body of liquid which is at a temperature which varies with changes in the operating conditions within a range which is between the minimum temperature along said liquid cooling path and the maximum temperature along said liquid heating path.

2. The method as described in claim 1 wherein said streams of return liquid from said zones are delivered to a common return line and are pumped to a common supply line, and wherein said stream of return liquid from said storage path is delivered directly to said liquid supply line.

3. The method as described in claim 2 which includes exerting overall control upon the entire system, so as to add auxiliary heat only when the heating requirements are not satisfied by the heat available within the system, and so as to discharge heat from the system only when there is an excess of heat, including the steps of delivering only said return liquid stream to said storage path when the heat produced within the system equals the heat requirements of the system.

4. The method as described in claim 3 which includes the step of mixing chilled liquid with the return liquid stream flowing to said storage path when the requirements for heat exceed the amount of heat available within the system, and mixing heated liquid with the return liquid stream flowing to said storage path when the heat available within the system is in excess of the heat requirements for the system.

5. The method as described in claim 4 wherein the delivery of liquid to said storage path is stopped during maximum heating load conditions.

6. The method as described in claim 5 wherein the delivery of liquid to said storage path is stopped during maximum cooling load conditions.

7. The system as described in claim 3 wherein the mixing of heated liquid and the chilled liquid with the return liquid stream in each instance is modulated from 100% return liquid stream to no return liquid stream.

8. The system as described in claim 3 which includes the step of supplying a variable amount of outside air with a minimum requirement being supplied during operating conditions when the system requires a moderate amount of heating and also when heat is neither being added to nor being discharged from the system, and wherein a maximum amount of air is supplied to aid in the discharging of heat from the system when that is required and when the outside air temperature is below a predetermined level.

9. In the art of maintaining comfort conditions in a plurality of zones one of which may require the removal of heat while another requires the addition of heat, the steps of, delivering a stream of heat-absorbing-and-discharging liquid for each of said zones to provide controlled delivery of heat to and removal of heat from the zone, circulating air in heat exchange relationship with respect to each of said streams and thence within the respective zone, flowing said streams as return liquid to a central station, utilizing refrigeration to provide a liquid cooling path and a liquid heating path at said central station, passing said return liquid in two streams one of which flows along said cooling path to provide a stream of chilled liquid and the other of which flows along said heating path to provide a stream of heated liquid, providing controlled flow of said streams of chilled liquid and heated liquid as makeup liquid for said streams of heat-absorbing-and-discharging liquid in accordance with the heating and cooling requirements of the respective zones, passing the remainder of said streams of chilled liquid and heated liquid which is not used as makeup liquid along a liquid storage path and from said storage path to said streams of return liquid, accumulating liquid along said storage path to provide a body of liquid which is at a temperature which varies with changes in the operating conditions within a range which is between the minimum temperature along said liquid cooling path and the maximum temperature along said liquid heating path, and exerting control upon the system in accordance with the temperature of the conditioned air flowing to one of said zones.

10. In the art of air conditioning which utilizes refrigeration means to cool return liquid to produce streams of chilled liquid and heated liquid and in which said streams are used to heat and cool air to balance the heating and cooling loads and wherein heat is discharged from the system only when there is a net cooling load in the system and auxiliary heat is provided in the system only when there is a net heating load in the system, that improvement which comprises, storing a body of said liquid in a bypass storage path extending from said streams of chilled liquid and heated liquid to the return liquid passing to said refrigeration means whereby chilled liquid and heated liquid flows from said streams along said storage path in an inverse relationship with respect to the respective net requirements for chilled liquid and heated liquid for said zones, and exerting control functions upon the operation in accordance with the temperature of the conditioned air flowing to one of said zones.

11. The art of air conditioning as described in claim 10 wherein the control functions are exerted with relation to the Break Even Temperature for the system.

12. The art as described in claim 11 which includes the step of circulating liquid to and from said body of liquid for all conditions of operation except when auxiliary heat is being provided in the system.

13. The art as described in claim 11 wherein the proportions of chilled liquid and heated liquid flowing along said storage path varies from substantially one hundred percent (100%) chilled liquid within the general range of the control temperature at which auxiliary heat is turned on to substantially one hundred percent (100%) heated liquid within the general range of the control temperature adjacent the range of substantially cooling load conditions.

14. The art as described in claim 11 which includes supplying outside air to the system at a rate which is not less than a minimum value throughout the range and which is increased to a maximum value within the range of substantial cooling when the outside air temperature is less than 75° F.

15. In the art of air conditioning a plurality of zones, the steps of, passing separate streams of chilled liquid and heated liquid to air treating means for the respective zones, storing a quantity of the liquid along a storage path, and passing chilled liquid and heated liquid to said storage path in an inverse relationship with respect to the net requirements for chilled liquid and heated liquid for said zones.

References Cited
UNITED STATES PATENTS 3,608,625    9/1971    Kendrick            165—122

CHARLES SUKALO, Primary Examiner

U.S. Cl. X.R.

165—22, 50